Patented June 23, 1936

2,044,770

UNITED STATES PATENT OFFICE 2,044,770

COATED ARTICLE AND COMPOSITION THEREFOR

Edward R. Bush, Lemont, Ill., assignor to Chadeloid Chemical Company, New York, N. Y., a corporation of West Virginia No Drawing. Application August 4, 1931, Serial No. 555,138

13 Claims. (Cl. 134—79)

This invention relates to coated articles, and particularly to articles of manufacture carrying lacquer coatings, together with compositions for producing such coatings, and methods of applying such coatings to the stated articles of manufacture.

This specification is a continuation in part of application, Serial No. 405,054, filed November 5, 1929, entitled "Wood stains".

Lacquers, particularly of the nitrocellulose type that have heretofore been utilized in the art, when employed with dyes to color such lacquers, have been subject to a number of disadvantages and objectionable features. Such prior art nitrocellulose lacquers are incompatible with water-soluble aniline dyes, so that the water-soluble aniline dyes could not be employed in producing satisfactory lacquer compositions with those prior art lacquers. This was primarily due to the character of the solvents employed in producing the nitrocellulose lacquers. Consequently in producing nitrocellulose lacquers containing dyes, the prior art was limited to the use of the alcohol or spirit-soluble dyes and the oil-soluble dyes.

The oil and spirit-soluble dyes, however, gave unsatisfactory dyed lacquers because such oil and spirit-soluble dyes are not fast and materially fade under the action of light. A further defect and objectionable characteristic of such prior art lacquers containing either the oil-soluble or spirit-soluble dyes which were necessarily employed in such lacquers for reasons given above, lay in the fact that such dyed lacquers made the oil-soluble and spirit soluble aniline dyes subject to bleeding, that is when such lacquers were utilized as a primary or initial coat on articles of manufacture, and a subsequent overcoat of lacquer was applied thereto, there was bleeding of the dye from the first layer into the second layer.

Among the objects of the present invention is the production of light-fast lacquer coatings that are substantially non-bleeding, and articles of manufacture carrying such coatings.

Other and further objects and advantages of the present invention will appear from the more detailed description given below, it being understood however that this more detailed description is given by way of explanation and illustration only, and not by way of limitation, since various changes may be made therein by those skilled in the art without departing from the scope and spirit of the present invention.

In accordance with the present invention, coating compositions, and particularly coating compositions of the nitrocellulose lacquer type, are produced utilizing water-soluble aniline dyes for coloring the lacquer compositions. Such lacquers containing the water-soluble aniline dyes are substantially fast to light and do not exhibit bleeding properties, so that all of the desirable features of dyed lacquers are obtained without the defects of the prior art compositions.

In producing such dyed lacquers, the nitrocellulose solution or other cellulose ester solution containing the water-soluble aniline dyes or other light-fast or non-bleeding dyes, are incorporated with a cellulose ester solvent that is compatible with the chosen dye. Other desirable ingredients may also be included in the composition, such as plasticizers, softeners for the nitrocellulose, when desired, resins both synthetic and natural, rapidly volatilizing solvents or diluents to increase the rate of evaporation of the composition, water eliminants, etc.

In one method of carrying out the present invention, the penetrating wood stains themselves made with the water-soluble aniline dyes may be utilized as the vehicle for the nitrocellulose, the nitrocellulose being dissolved directly in such wood stain compositions, or a nitrocellulose solution in a desired solvent or solvent mixture being added to the wood stain compositions. Such wood stain compositions may, for example, be made from the water-soluble aniline dyes, together with a wood penetrating or wood penetrant vehicle. The use of the term "wood penetrating" or "wood penetrant" in describing the vehicle is not to imply that the coating compositions and lacquers of the present invention are limited to the use on wood surfaces, but to characterize a certain class of solvent vehicle that may be employed in carrying out the present invention. The class of ether alcohols, that is the group of organic compounds that includes both an ether and an alcohol group in the compound molecule, are particularly desirable solvents to be employed in such lacquers, because such glycol ethers or ether alcohols are in general excellent solvents for cellulose esters, and particularly nitrocellulose, and are also excellent solvents for the water-soluble aniline dyes. Among the ether alcohols, the glycol ethers are particularly important for use in these lacquer compositions, and as illustrative of such compounds, there may be mentioned specifically "Cellosolve", "Carbitol" and "Butyl carbitol". Due to the fact that the solubility of the aniline dyes in such glycol ethers varies to some extent, the solvent vehicle chosen should be one preferably that is a complete and satisfactory solvent for the particular dye to be utilized in the composition, and also for the nitrocellulose. Of course, compound solvents may be employed utilizing for example the glycol ethers as the basic element of such compound solvents. "Carbitol", chemically diethylene-glycol monoethyl ether, is a particularly valuble component of these lacquer solutions because of the solubility of both the nitrocellulose and of the various water-soluble aniline dyes therein. Butyl carbitol, which is the mono-butyl ether of diethylene glycol, is also an excellent solvent for these purposes, but does not have as great a solvent action on the black aniline dyes, such as the nigrosines, as does "Carbitol" itself. "Cellosolve", the monoethyl ether of ethylene glycol is also a valuable solvent, but also does not exhibit as great a solvent action on the aniline blacks as does "Carbitol". "Carbitol" may, therefore, be looked upon as the particularly desirable solvent of this group for utilization in connection with the present invention. Any of the individual ether alcohols referred to above may be employed in producing the composition, or mixtures of several of the ether alcohols may be employed.

In preparing the solution of the dye in the chosen vehicle, various types of the water soluble aniline dyes may be employed as illustrated by the following: as blacks, Buffalo black NBR conc.; as reds, Azo Rubine ex conc. and amacid brilliant croecine 39A conc.; as orange, orange A conc.; as yellow, fast wool yellow 3GL; as brown, Resorcine brown; and as green, alkali green 200.

In producing the solutions of the water-soluble aniline dyes or other light fast or non-bleeding dyes, in these solvents, other ingredients desired in the final lacquer solution may also be included at this time. Since the lacquer solutions are usually desired to be rather rapid drying, and since in general the glycol ethers are rather slow drying, composite solvents made with the glycol ethers may be employed. For this purpose, any desired additional solvent and vehicle ingredients may be added to the chosen dye solution in the glycol ether to secure the desired properties in the final composition. The solvents or diluents or additional vehicles utilized should desirably be relatively inexpensive, so that they become commercially practicable for the use in hand. They should be solvents of or miscible at least with the dye dissolved in the particular penetrating vehicle component, and should at least be compatible with all of the solids elements of the composition, such as the nitrocellulose, at least in the presence of the other elements of the composition. Water eliminants may also be employed, so that the combination of solvents or diluents or vehicles should yield a final composition that exhibits a proper evaporation curve to dispel both the "Carbitol" or other penetrant vehicle and any moisture present in the final composition, in order to yield smooth surface coatings of the lacquer.

Any of the ingredients ordinarily employed as solvents, vehicles or diluents in nitrocellulose lacquers may be employed provided that they are compatible with the dyes employed in the solution. As illustrative of such ingredients there may be utilized the aliphatic alcohols, such as methyl, ethyl, propyl, butyl, isobutyl, amyl, alcohols, ketones, such as acetone, the esters of the aliphatic alcohols, and particularly the fatty acid esters of such materials, such as ethyl acetate, butyl acetate, amyl acetate, etc., plasticizers and softeners, such as ethyl phthalate, butyl phthalate, dibutyl phthalate, triphenylphosphate, tricresylphosphate, etc. are exemplary of such constituents that may be employed in the composition. Ethyl alcohol or methanol may also be utilized in making up these compositions, but such highly volatile solvents as methyl alcohol or synthetic methanol, should not be utilized to an extent which makes the composition so rapidly drying that a satisfactory coating is not deposited.

Ingredients that increase the resistance of the composition to moisture retention may, of course, be employed, including the hydrocarbon distillates, and particularly the coal tar distillates, benzol, toluol, solvent naphtha, the xylols, ethyl benzene, etc. Toluol is a particularly important ingredient of this character. Many of the esters, such as butyl propionate and butyl acetate are also exemplary of materials which have water eliminant properties, but due to their higher boiling point and slower drying characteristics, and also increased cost, they are not as valuable in general in compositions of the present character as are the hydrocarbon substances, such as toluol.

The following example illustrates a good composite solvent for use in connection with the water-soluble aniline dyes, the parts being by volume:

| | Parts |
|---|---|
| "Carbitol" | 1 |
| Methyl alcohol | 9 |
| Toluol | 6 |

Such composite solvent may be utilized with, for example, from 2 to 2½ ounces of the particular dye to one gallon of the composite solvent. The amount of dye utilized depends on the particular dye itself and its degree of concentration, and the depth of color required in the particular final composition. To some extent, the strength of the dye solution may be varied by the amount of "Carbitol" or other ingredients of the solvent utilized. The dye solution may be made up by allowing the aniline dye to stand with the "Carbitol", for example, until the dye dissolves after which the other ingredients may be added. To such solution, the nitrocellulose may be added and dissolved in that solution, or a solution of nitrocellulose in a desired solvent may be admixed with the dye solution. Or all of the solid ingredients, including the dye and the nitrocellulose may be dissolved simultaneously in the composite solvent.

The proportions of solvents and ingredients in the composite solvent may be varied within wide limits, and except for particular purposes as noted, the additional diluents or solvents may be substituted by other materials.

When a composition of increased dye strength is desired, the following solvent mixture may be employed:

| | Parts |
|---|---|
| "Carbitol" | 3 |
| Methanol | 9 |
| Toluol | 4 |

This composite solvent mixture may be used in connection with 4 ounces of the aniline dye per gallon of the composite solvent. Other exemplary mixtures include 1 or 2 parts by volume of "Carbitol" to 9 parts of methanol and 5 parts of toluol. However, it should be noted that these solvent mixtures are merely exemplary and illustrate the various types of solvent mixtures that may be employed in connection with the present invention.

The cellulose esters, such as the nitrocellulose, employed in these compositions, may be looked upon as the film-forming solids component of the coating composition. The nitrocellulose employed may be any of the nitrocelluloses on the market including nitrocellulose of ordinary viscosity and also the low viscosity nitrocellulose. Other cellulose esters, such as cellulose acetate may be employed in producing coating compositions, as well as other cellulose compounds, such as the cellulose ethers.

These materials are exemplary in general of the solids components of the composition that form the film of the final coating.

Additional ingredients, as explained above, that may be included in the composition include the various resins, both natural and synthetic, such as the natural resins, rosin, dammar, congo, and the chemically modified natural resins, including rosin ester, acetylated congo, etc. The synthetic resins include the phenol formaldehyde types of resins, cumarone resins, vinyl resins, phthalic glyceride types of resins, etc. Of the resins chosen, desirably these resins should be compatible with the cellulose ester of the composition, and should, of course, not precipitate out the dye components to any substantial extent. The phthalic glyceride resins are exemplary of synthetic resins that are compatible with the nitrocellulose and the other elements of the composition. Among the phthalic glyceride types of resins, there may be specifically mentioned the phthalic glyceride resins produced with a fatty oil component, either the oil itself, or fatty acids derived from the oils, such fatty oil component being tied up in the resin molecule. Fatty acids of the drying oils are particularly desirable as combined elements in such phthalic glyceride resins.

While the production of transparent lacquer coatings is particularly important in connection with the present invention, where desired, pigments may be included in the composition.

The dyed lacquers produced in accordance with the present invention may desirably be used for coating various articles of manufacture, whether such articles are made of wood, metal, glass, paper, fabric, etc. The dyed lacquers of the present invention may be utilized as initial coats over which various topcoats of different or similar character may be applied. For example, lacquer topcoats may be applied over the initial dye lacquer coats of the present invention, and such topcoats may if desired be substantially transparent.

Another feature of the present invention will become apparent in considering this invention from a slightly different angle. Reference has been made above to the utilization of wood stains of desirable properties for forming the base of the nitrocellulose lacquers in which the cellulose ester is dissolved in the wood stain composition. The wood stains as such when applied to dye pervious surfaces, such as wood, penetrate into the wood surface and deposit the dye both upon and below the surface of the wood article. The inclusion of the cellulose ester or other film-forming solids component serves to check control and limit the penetration of the dye into the dye pervious surface. That is, the production of lacquers in accordance with the present invention may be made by employing the nitrocellulose or other cellulose ester or solids component of the coating composition, to prevent substantial penetration of the dye into the surface to which the dye solution is applied. On the other hand, by varying the content of such solids component of the composition, the degree of penetration of the dye into the dye pervious surface may thus be controlled. From this point of view, therefore, the inclusion of a film-forming solids component in the coating composition, which solids component serves either to prevent completely the penetration of dye into the dye pervious surface, or through the proportion of the solids component present, may serve to determine the degree of penetration of the dye into the dye pervious surface, is an important feature of the present invention. It is thus possible under the present invention to apply these coating compositions containing substantial proportions of the solids component to form a coating on the article, and at the same time to secure a material degree of penetration of the dye into the dye pervious surface. Such effects may desirably, for example, be produced on wood articles.

Where desired, however, and where it is important to prevent completely any dye penetration into the underlying dye pervious surface, if desired a priming composition may be employed over which the dye lacquers of the present invention are then applied. In such instances, further top coats may be placed over the dyed lacquer if desired.

The compositions of the present invention may be employed as brushing lacquers, dipping lacquers, lacquers for spraying, or for other analogous usage.

The lacquers carrying water-soluble aniline dyes of the present invention may desirably be used as topcoats over wood or other surfaces stained with the wood stains. When, for example, wood carrying these stains is also coated with a lacquer carrying a dye similar to that used in dyeing the wood desirable depth of color and improved appearance is obtained.

The following example illustrates one method of checking the penetration of stain by means of a film-forming composition introduced into the stain itself, the film-forming composition in this instance being represented by lacquer. An ordinary nitrocellulose lacquer composition may be employed for this purpose. This example illustrates checking penetration into any soft spots that may appear in a piece of wood that is being stained. If, for example, a dozy piece of sap gumwood is treated with the usual stain composition, the stain will accentuate the soft spots and exhibits a tendency to make such soft spots black. This was also true with the prior art types of water stains, which due to excessive absorption of stain at such soft spots also had a tendency to turn them black. Consequently, in the treatment of such types of wood where soft spots may be present, it is not possible to get as uniform a color with even water stain as is usually desired. By the introduction of lacquer into the stain composition, it is possible to produce a sound even coating, even on the soft dozy wood.

A formula that may be employed for use as a shading stain, as well as staining with the addition of lacquer, may include the incorporation of 5% of a nitrocellulose lacquer to a stain composition produced as set forth hereinabove. The proportion of lacquer to stain in the composition will, of course, be determined by the result which it is desired to produce. A small amount of lacquer will serve to check without completely preventing penetration of the dye, while the amount of film-forming ingredient or lacquer can be increased to a point where almost all penetration of the dye is virtually checked. When some penetration is desired, satisfactory results will be obtained by the use of from 5 to 25% of lacquer composition added to the dye solution or stain. Higher proportions of lacquer may also be used in accordance with the principles set forth above when it is desired to check penetration of the dye to an even greater extent. For shading work primarily, 5% of stain may be added to the lacquer, and this gives a very satisfactory shading coat, for some purposes even better than when greater proportions of stain are included in the lacquer composition.

Since the high boiling solvent materials present such as "Carbitol" has a tendency to retard the drying of a lacquer, the adjustment of the evaporation ranges of the solvent vehicles may be accomplished when the presence of substantial amounts of a high boiling material like "Carbitol" is used by the addition of greater amounts of the low boiling solvents to maintain the desired balance.

Having thus set forth my invention, I claim:

1. As a coating composition, in combination, a cellulose ester, a water soluble aniline dye, and a glycol ether in proportions to yield a light-fast, non-bleeding coating.

2. As a coating composition, in combination, a cellulose ester, a water soluble aniline dye, a glycol ether, a rapidly volatilizing ingredient, and a water eliminant in proportions to yield a light-fast, non-bleeding coating.

3. An article of manufacture carrying a coating deposited from a composition of a cellulose ester, a water-soluble aniline dye, and a glycol ether.

4. An article of manufacture carrying a substantially light-fast, non-bleeding coating deposited from a composition of a cellulose ester, a water-soluble aniline dye, and a glycol ether, and a lacquer overcoat over the first-named coating.

5. As a coating composition: a cellulose ester, a water-soluble aniline dye, "Carbitol", toluol, and methanol in proportions to yield a substantially clear, rapidly volatilizing solution giving a light-fast, non-bleeding coating.

6. As a coating composition: a cellulose ester, a water-soluble aniline dye, a glycol ether, and toluol in proportions to yield a substantially clear, rapidly volatilizing solution giving a light-fast, non-bleeding coating.

7. As a coating composition: a cellulose ester, a water-soluble aniline dye, a glycol ether, and methanol in proportions to yield a substantially clear, rapidly volatilizing solution giving a light-fast, non-bleeding coating.

8. As a coating composition: a cellulose ester, a water-soluble aniline dye, a glycol ether, and a volatile hydrocarbon component in proportions to yield a substantially clear, rapidly volatilizing solution giving a light-fast, non-bleeding coating.

9. As a coating composition: a cellulose ester, a water-soluble aniline dye, a glycol ether and a rapidly volatilizing organic component increasing the rapidity of drying and setting of the composition, the ingredients being present in proportions to yield a substantially clear, rapidly volatilizing solution yielding a light-fast, non-bleeding coating.

10. As a coating composition: a cellulose ester, a water-soluble aniline dye, a volatile solvent therefor including a glycol ether, a volatile hydrocarbon component selected from the group consisting of benzol, toluol, solvent naphtha, xylol, ethyl benzene and coal tar distillates; and a rapidly volatilizing organic component increasing the rapidity of drying and setting of the composition, said rapidly volatilizing organic component being selected from the group consisting of the aliphatic alcohols, ketones, and the esters of the aliphatic alcohols, the ingredients being present in proportions to yield a rapidly volatilizing clear solution giving a light-fast, non-bleeding coating.

11. As a coating composition: a cellulose ester, a water-soluble aniline dye, a substantially non-aqueous volatile organic solvent for the cellulose ester and for the water-soluble aniline dye, and a substantially non-aqueous rapidly volatilizing organic non-solvent component, the ingredients being present in proportions to yield a substantially non-aqueous clear solution rapidly drying and setting to a light-fast non-bleeding coating.

12. As a coating composition: a cellulose ester, a water-soluble aniline dye, a member of a group consisting of ethylene glycols and alkyl ethers of ethylene glycols, and a common organic solvent as a dispersion medium.

13. A composition as set forth in claim 12 in which the dispersion medium is selected from a group consisting of alcohols and members of the benzene series of hydrocarbons.

EDWARD R. BUSH.